US005959822A

United States Patent [19]

Bock et al.

[11] Patent Number: 5,959,822

[45] Date of Patent: Sep. 28, 1999

[54] COMPACT LIGHTNING ARRESTER ASSEMBLY

[75] Inventors: Larry E. Bock, Glen Falls, N.Y.; David S. Birrell, Cummington, Mass.; Richard A. Chapin, Hudson Falls, N.Y.

[73] Assignee: Hubbell Incorporated, Orange, Conn.

[21] Appl. No.: 08/578,871

[22] Filed: Dec. 22, 1995

[51] Int. Cl.[6] ...... H02H 3/22

[52] U.S. Cl. ...... 361/117; 361/126; 361/127; 337/28

[58] Field of Search ...... 361/117, 126, 361/127, 111; 337/28, 34; 338/21

[56] References Cited

U.S. PATENT DOCUMENTS

| | | | |
|---|---|---|---|
| 4,288,833 | 9/1981 | Howell | 361/124 |
| 4,362,962 | 12/1982 | Lange | 313/331 |
| 4,423,404 | 12/1983 | Goedde et al. | 338/21 |
| 4,656,555 | 4/1987 | Raudabaugh | 361/117 |
| 4,851,955 | 7/1989 | Doone et al. | 361/127 |
| 4,864,456 | 9/1989 | Thuillier et al. | 361/126 |
| 4,905,118 | 2/1990 | Sakich | 361/117 |
| 5,088,001 | 2/1992 | Yaworski et al. | 361/127 |
| 5,103,135 | 4/1992 | Lange et al. | 313/623 |

FOREIGN PATENT DOCUMENTS

| | | |
|---|---|---|
| 9414586 | 12/1994 | France . |
| 0642141 | 3/1995 | Germany . |

*Primary Examiner*—Sally C. Medley
*Attorney, Agent, or Firm*—Jerry M. Presson; Mark S. Bicks; Carl B. Horton

[57] ABSTRACT

A lighting arrester in the form of a double-ended polymer enclosure contains one or more varistor discs in vertical alignment having terminals at the opposing ends for external electrical connection. The discs are formed from a zinc oxide composition with metal electrodes on opposing faces that are electrically connected with each other and with the end terminals by U-shaped metal straps.

11 Claims, 5 Drawing Sheets

COMPACT LIGHTNING ARRESTER ASSEMBLY

BACKGROUND OF THE INVENTION

Lightning arresters in the form of metal oxide varistor discs are used to protect electrical equipment and personnel from overvoltage surges usually caused by lightning. The varistors are arranged within electrically-insulative enclosures in a stacked array to provide an electrical series circuit whereby the clamping voltage of the arrester is determined by the series addition of the individual varistor clamping voltages.

To provide good electrical connection between the varistors within the stacked array, the varistors are often bound together by polymer filaments prior to insertion within the enclosures and compression springs are positioned at one or both ends to provide compressive forces to the varistors to insure good electrical connection. Spring washers and the like are also positioned between the varistors to provide additional compressive forces for enhanced electrical connection. U.S. Pat. Nos. 4,656,555 and 4,864,456 describe the use of filament windings and compression springs to improve electrical connection between the varistors per se as well as between the varistors and the arrester end terminals.

The use of such springs, washers and filaments add to the manufacturing complexity and costs since some time and material is involved in the winding and installation processes. It would be economically advantageous to provide good electrical connection between the varistors themselves as well as between the varistors and the arrester end terminals without requiring any such filaments, springs or washers.

One purpose of the invention is to provide a lightning arrester having excellent electrical continuity between the varistors in a stacked array and between the varistors and the end terminals of the arrester without requiring additional compressive devices.

SUMMARY OF THE INVENTION

Metal oxide varistors used within lightning arresters are electrically connected together by means of electrically-conductive metal straps that are attached to the varistors during the manufacturing process. The straps are then attached to adjoining varistors in a stacked array to provide series electrical connection. The straps attached to the varistors at the opposite ends of the array are connected to the end terminals of the arresters.

DESCRIPTION OF THE PREFERRED EMBODIMENT

Figure 1:
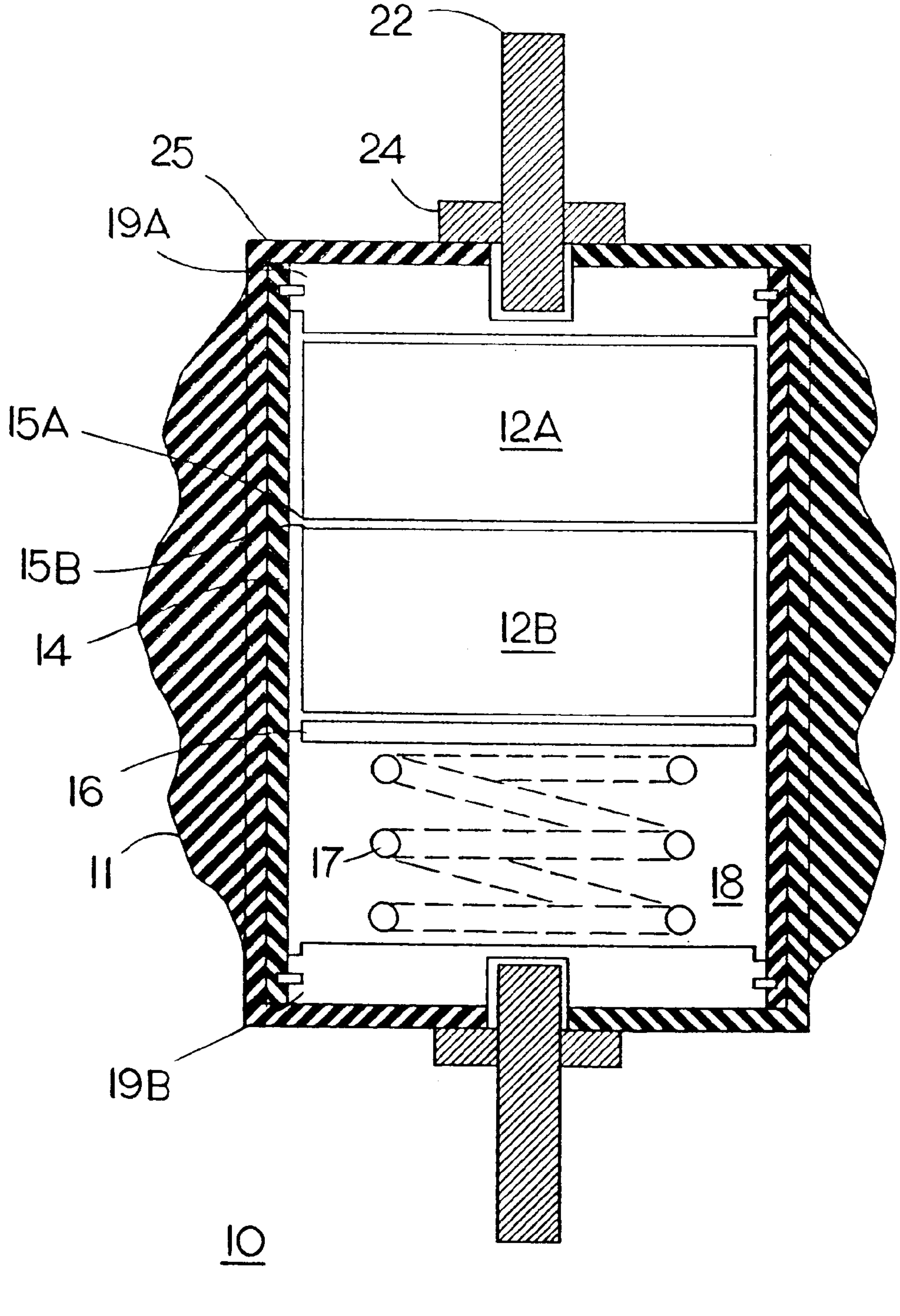
FIG. 1 is a front sectional view of a lightning arrester in accordance with the Prior Art.

A lightning arrester 10 similar to that described in aforementioned U.S. Pat. No. 4,656,555 is shown in FIG. 1 to depict the state of the art of such devices. Two or more varistors 12A, 12B are aligned within a polymer or ceramic housing 11 that is cylindrically shaped to provide maximum over-surface creepage and clearance between the opposing studs 22, that are used for external electrical connection with the varistors, as well as to provide environmental protection to the varistors. As depicted at 15A, 15B, the varistors include conductive electrodes on their opposing faces for connection with the zinc oxide varistor within. The electrode is typically flame or sprayed aluminum or zinc. To insure good electrical connection between the electrodes, a supplemental metal disc is usually interfaced between the electrodes as shown in the aforementioned U.S. Pat. No. 4,656,555 and top and bottom end plugs 19A, 19B are used to provide electrical connection between the varistors and the studs 22 that are attached to the end plates 25. A supplemental compression spring 17 and corresponding contact plate 16 are inserted at one or both ends of the varistor stack to provide added compressive forces to the varistors for enhanced electrical conduction. The rigid tube 14 interfaces between the interior surface of the polymer housing and the varistor stack to improve moisture resistance as well as to provide added mechanical support to the housing. The rigid tube could be slid into the polymer housing, or the polymer housing could be directly molded onto the rigid tube as is the case with the unit depicted in FIG. 1. To further protect the varistors from moisture contamination, the interior of the housing is filled with a potting compound to eliminate free air space.

Figure 2:
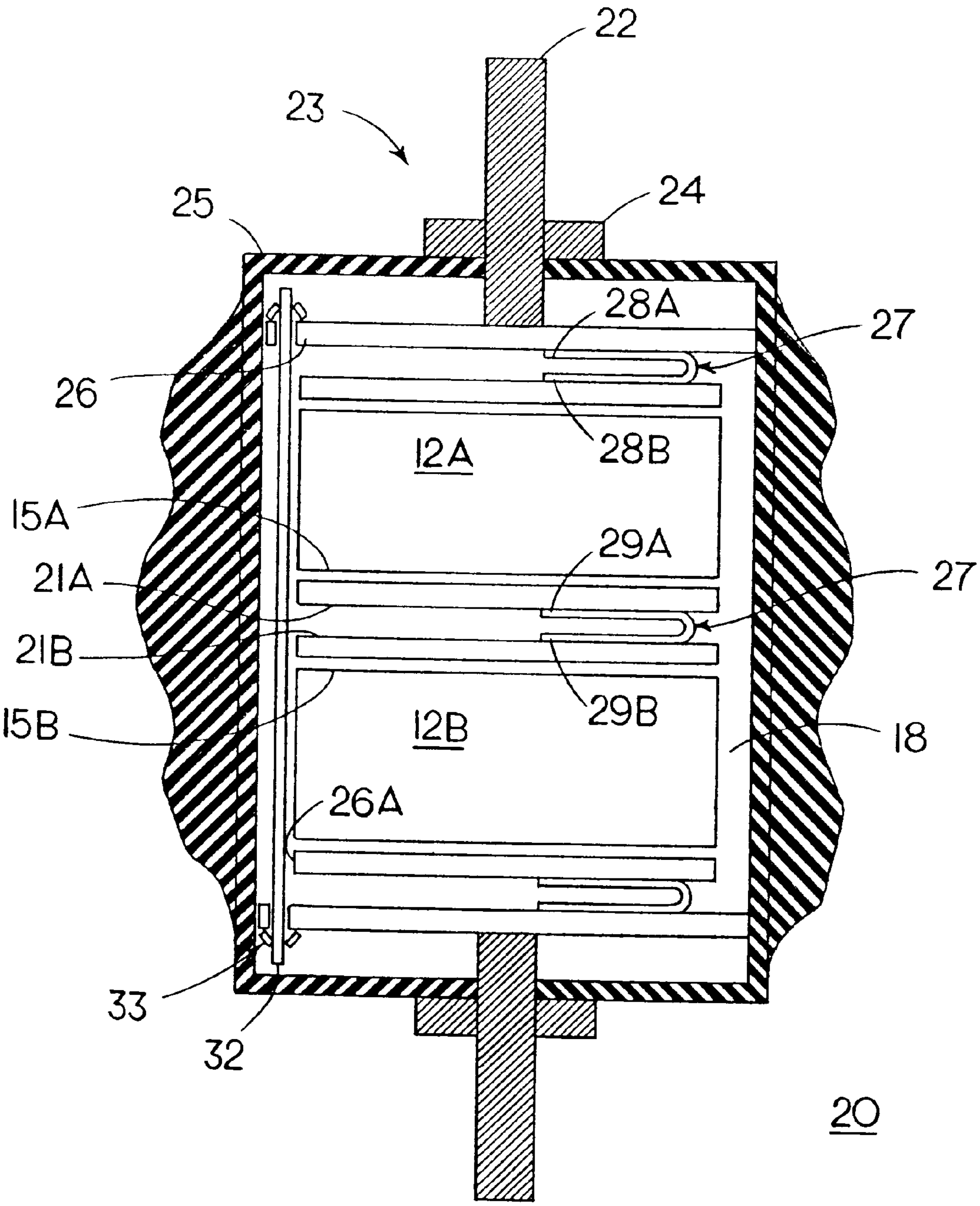
FIG. 2 is front sectional view of a lightning arrester in accordance with one embodiment of the invention.
Figure 3:
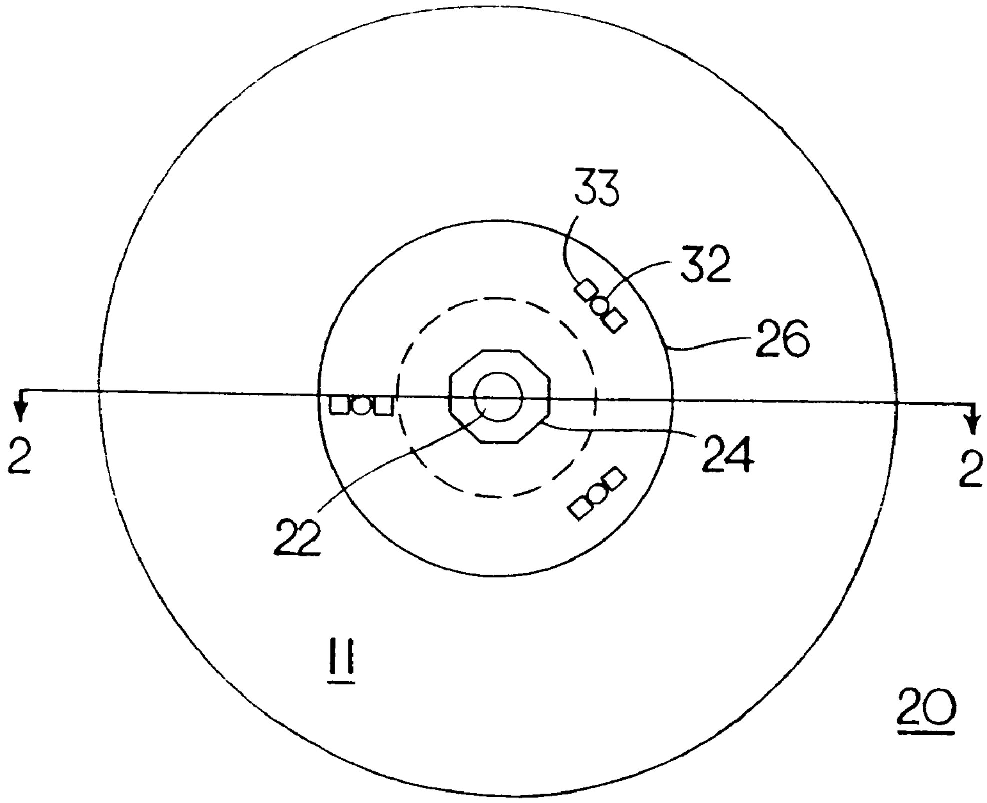
FIG. 3 is a top plan view of the lightning arrester of FIG. 2.

The lightning arrester 20 of the invention as shown in FIGS. 2 and 3 is similar in part to that of FIG. 1 and like reference numerals will be employed where possible. In accordance with the teachings of the invention, the electrodes 15A, 15B on the varistors 12A, 12B are first coated with a conductive metal such as aluminum or zinc as indicated at 21A, 21B.

Connector straps 27 made of tinned copper straps or braid are attached to the electrodes as shown at 29A, 29B by resistance soldering, or oven soldering. Both the solder and the flux must be carefully chosen. Solders require a melting point above 200° C. to prevent softening and removal of the connecting strap with high current of energy insertion. Fluxes require a rosin flux suitable for electrical connection. Acid and urea fluxes will degrade ZnO varistor grain boundaries increasing leakage currents. A solder and flux combination that will work for high voltage varistors is a 95 to 96.5% Tin and 3.5 to 5% silver solder and Kestor's SP88 flux. This combination will effectively attach a tinned copper strap 27 to a varistor electrode 29A, 29B of either sprayed zinc or aluminum with a brass or copper coating. Aluminum is used as the base electrode for its electrical conductivity, high melting point, and its ability to adhere to the varistor surface. A low current long cycle time resistance solder technique is used to prevent overheating and degradation of the varistor 12A, 12B. Although it is known to solder conductor leads to low voltage surge arresters as described in U.S. Pat. No. 5,103,135 it was heretofore considered impractical in high voltage applications due to the large instantaneous currents that are transferred through the soldered connections when the varistors are rendered conductive. U.S. Pat. No. 4,288,833 teaches the use of a soldered lead connection to a low voltage surge arrester for the specific purpose of melting the soldered connection to interrupt the series current in the event the arrester becomes inoperative or damaged. U.S. Pat. No. 4,362,962 describes one such attempt to weld gas discharge type surge arresters by means of tapered cylindrical electrodes. According to the instant invention, the varistors 12A, 12B are first electrically interconnected with each other by means of the connector straps 27 and then to the contact plates 26, as indicated at 28A, 28B. Connector straps 27 may also be joined to contact plates 26 by mechanical means in lieu of soldering. The contact plates form a part of the unique stud terminals 23 that attach to the end plates 25 by means of studs 22 integrally-formed with the contact plates that are secured to the arrester by nuts 24. Insulative support rods 32 serve to support the varistor-stud terminal assembly prior to insertion within the polymer housing. The support rods extend through openings 26A in the contact plates 26 and are retained in place by means of the spring clips 33. The varistor and stud terminal assembly is then inserted within the polymer housing 11 without requiring any compression springs or washers to insure good electrical interconnection between the varistors per se or between the varistors and the contact plates. To provide further moisture protection, the interior of the polymer enclosure is filled with a similar potting compound 18, as described earlier. An earlier use of insulative support rods for supporting varistors during a silicone casting process is found in U.S. Pat. No. 5,291,366.

Figure 4:
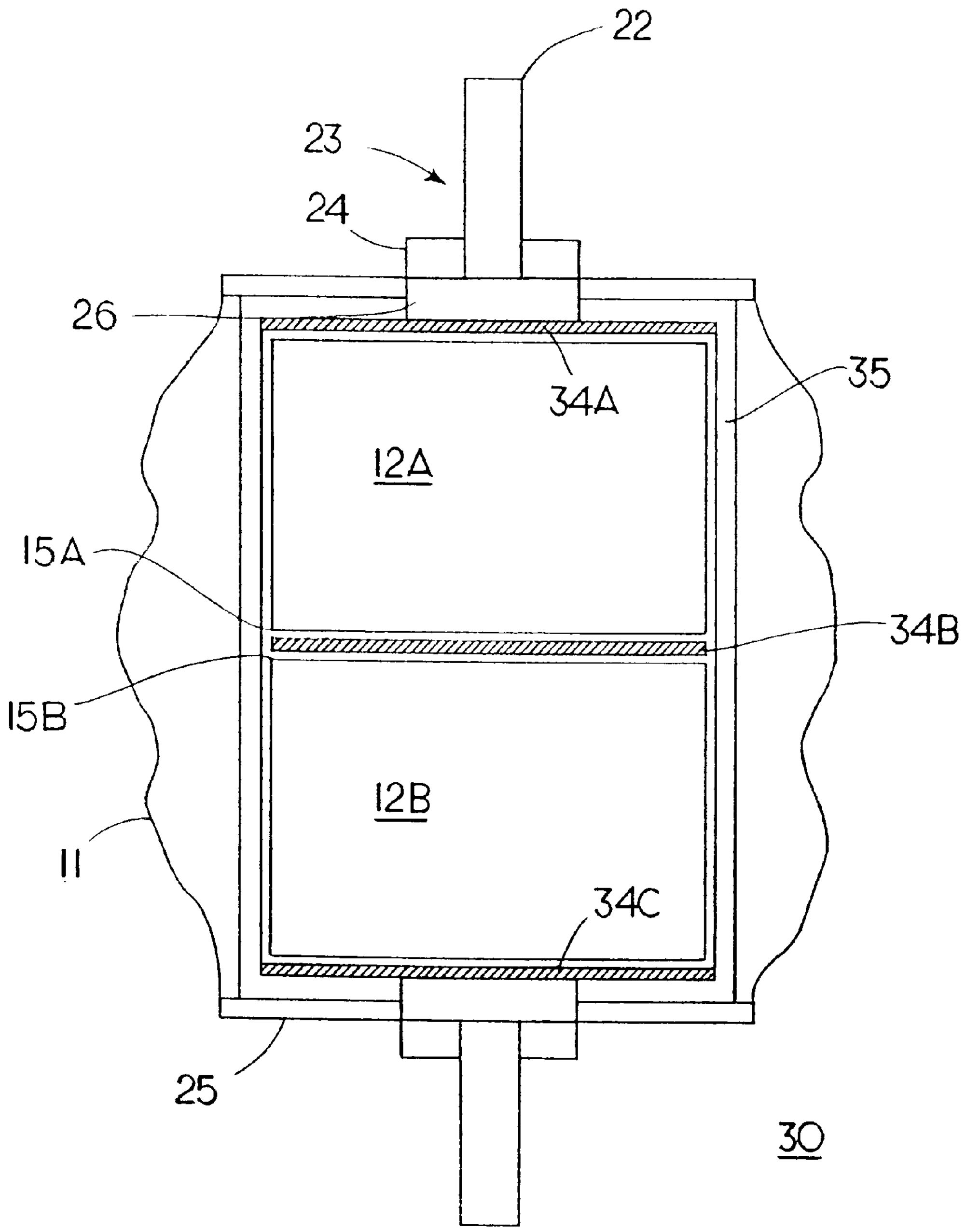
FIG. 4 is a front sectional view a second embodiment of the lightning arrester of the invention.

The lightning arrester 30 shown in FIG. 4 is an example of an inexpensive "soldered" connection between stacked varistor elements 12A, 12B. The varistor electrodes 15A, 15B are each coated with an electrically-conductive epoxy as indicated at 34B and the contact plates 26 at the ends of the studs 22 at opposite ends of the polymer housing are also coated with the conductive epoxy as indicated at 34A, 34C. One such epoxy composition having excellent electrical conductivity is obtained from Epotec Inc. The assembly consisting of the stud terminals and the varistors is subjected to compressive forces while the epoxy is allowed to cure. Immediately after curing the terminal and varistor assembly is inserted as a single unit within the polymer housing 11. The void volume within the polymer housing is filled with the potting compound as depicted at 35 and the nuts are attached to the studs 22 at both ends of the polymer housing to complete the arrester assembly.

Figure 5:
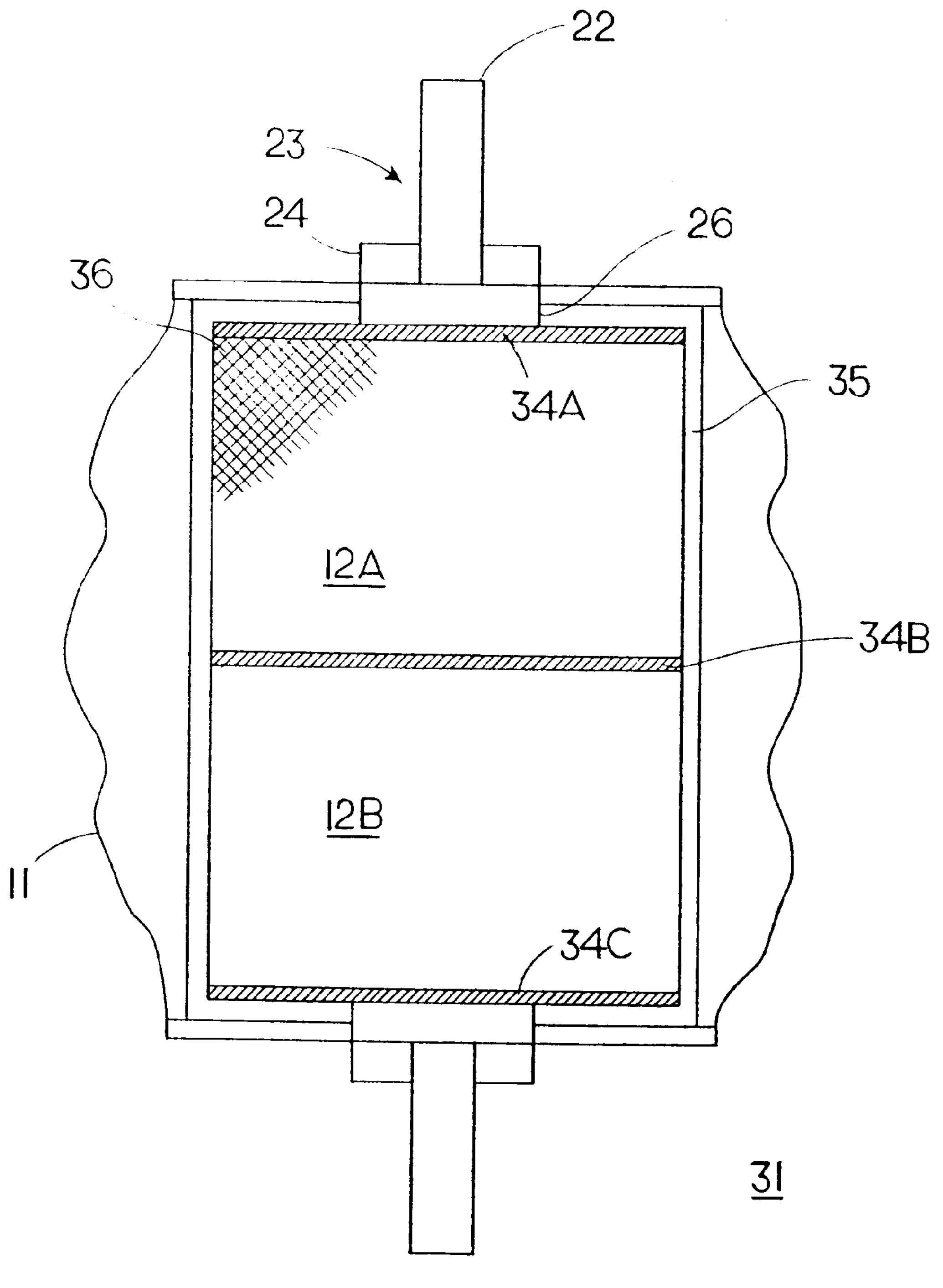
FIG. 5 is a further embodiment of the lightening arrester of FIG. 4.

The lightning arrester 31 depicted in FIG. 5 is similar to that of FIG. 4 and includes a pair of varistors 12A, 12B with the conductive epoxy interface coating 34B and epoxy end coatings 34A, 34C within the polymer housing 11. Prior to inserting the stud terminals 23 and the varistors 12A, 12B within the polymer housing, a fiber mesh nylon sleeve 36 is positioned over the varistors for additional resistance to the forces generated upon the failure of the arrester and resulting follow-thru current, as well as to promote increase adhesion between the varistors and the interior surface of the polymer housing when the potting material is introduced within the polymer and the nuts 24 are attached to the studs 22 to complete the arrester assembly.

A lightning arrester has herein been disclosed that meets stringent electrical code requirements without requiring additional compressive springs or washers within the arrester assembly. The use of metal straps for electrical interconnection of the varistors as well as connecting with the arrester terminals represents enhanced cost savings to the arrester manufacturer and supplier.

We claim:

1. A lightning arrester comprising:

an electrically insulative enclosure;

a first terminal connector arranged on a first end of said enclosure;

a second terminal connector arranged on a second end of said enclosure;

a first and a second varistor within said enclosure;

said first varistor comprising a first disk having first and second opposite faces;

said second varistor comprising a second disk having first and second opposite faces;

a first metal connector rigidly-connecting said first varistor with said first terminal connector;

a second metal connector rigidly-connecting said first varistor with said second varistor; and a third metal connector rigidly-connecting said second varistor with said second terminal connector.

2. The lightning arrester of claim 1 wherein said first and second varistors comprise zinc oxide.

3. The lightning arrester of claim 1 wherein said first and second faces of said first and second varistors include a metal coating.

4. The lightning arrester of claim 1 wherein said metal connectors comprise metal straps.

5. The lightning arrester of claim 1 wherein said first terminal connector comprises a threaded stud terminating in a metal contact plate at one end, said metal contact plate being rigidly attached to said first metal connector within said enclosure, said threaded stud extending external to said housing for receiving an external electrical connection.

6. The lightning arrester of claim 1 wherein said metal connectors comprise copper.

7. The lightning arrester of claim 1 wherein said enclosure comprises a polymer.

8. The lightning arrester of claim 1 further including a silicone material within said enclosure.

9. The lighting arrester of claim 1 wherein said first metal connector is rigidly connected to said first varistor and said first terminal connector by soldering.

10. The lighting arrester of claim 1 wherein said second metal connector is rigidly connected to said first varistor and said second varistor by soldering.

11. The lighting arrester of claim 1 wherein said third metal connector is rigidly connected to said second varistor and said second terminal connector by soldering.

* * * * *